UNITED STATES PATENT OFFICE.

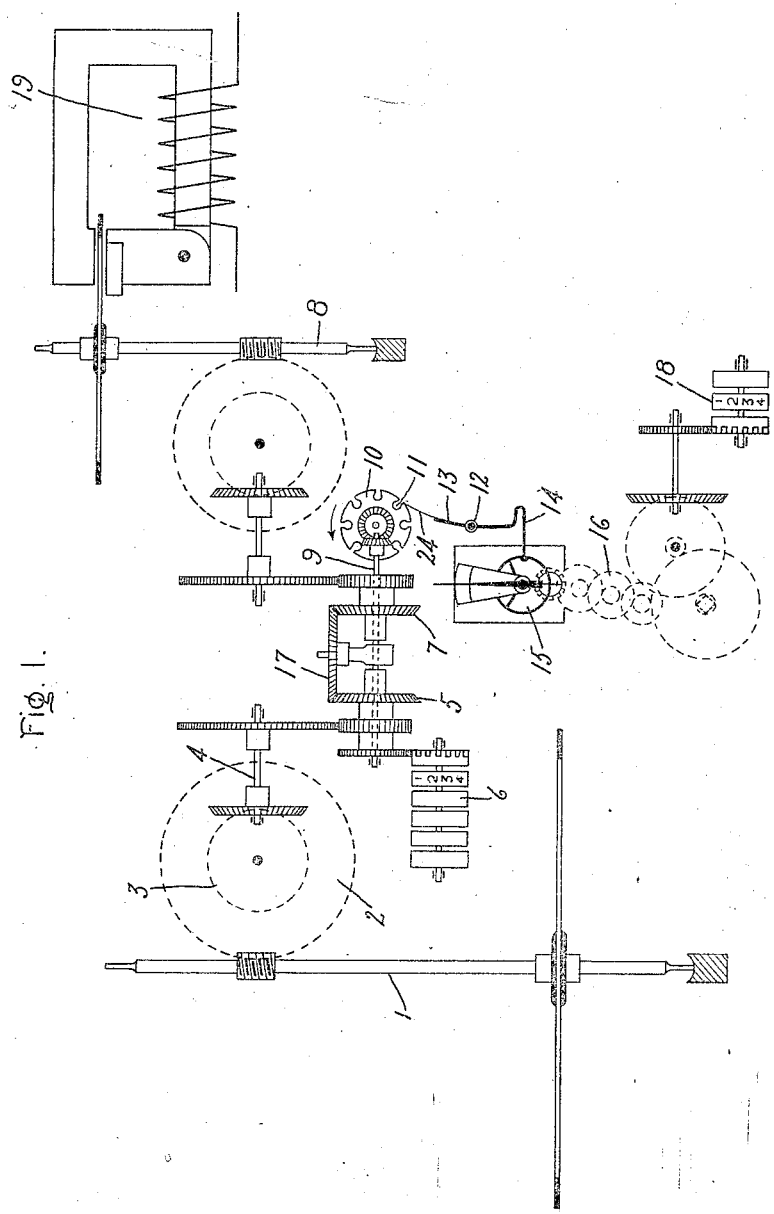

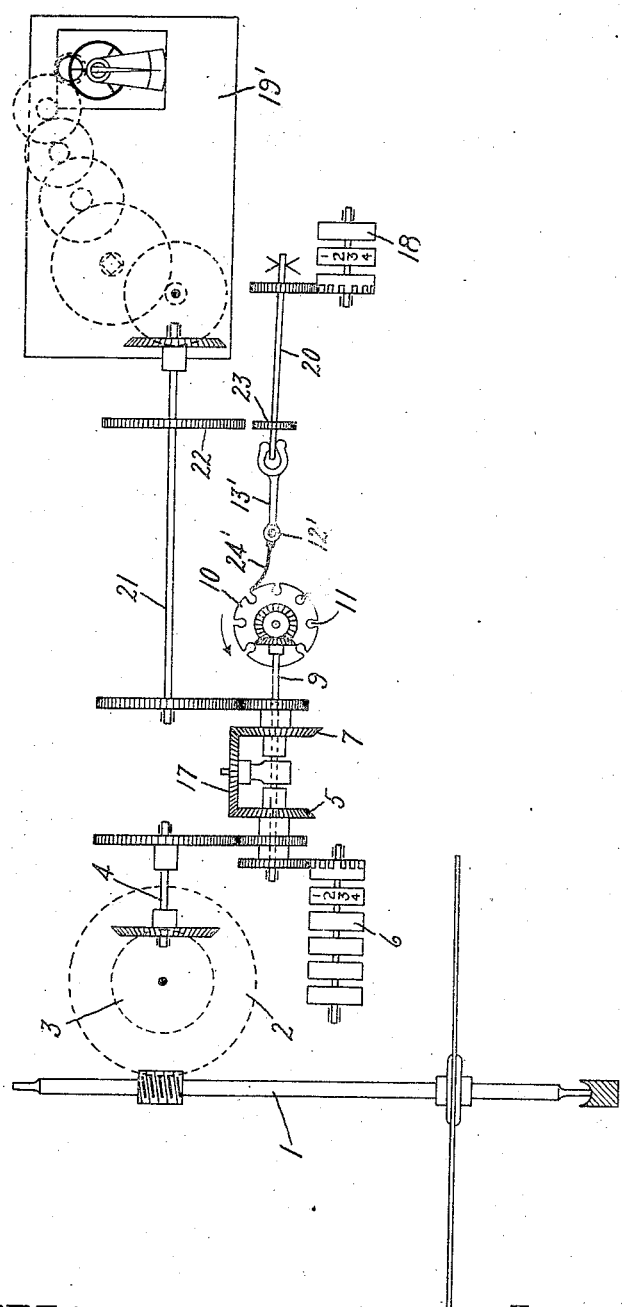

JOSEPH VIVELL, OF BERLIN, GERMANY, ASSIGNOR TO GENERAL ELECTRIC COMPANY, A CORPORATION OF NEW YORK.

ELECTRIC METER.

1,156,827. Specification of Letters Patent. Patented Oct. 12, 1915.

Application filed May 24, 1912. Serial No. 639,424.

*To all whom it may concern:*

Be it known that I, JOSEPH VIVELL, a subject of the Emperor of Germany, residing at Berlin, Germany, have invented certain new and useful Improvements in Electric Meters, of which the following is a specification.

My invention relates to meters and particularly to electric meters for determining the length of time the consumption of electricity in an electrical installation exceeds a certain predetermined value.

The objects of my invention are to provide a meter which will accurately register the total time that the consumption of energy is in excess of a certain predetermined quantity, and further to generally improve the construction of meters of this type.

The present tariff rates for electric energy often necessitate a knowledge of the length of time the consumption of energy exceeds a predetermined or contract value. Devices for determining this length of time are not new, but their operation, as at present constructed, is more or less complicated by the use of special apparatus.

My invention aims to overcome the objections to these older devices and to provide a meter which is simple in construction and accurate in operation.

The novel meter of my invention comprises in its complete form a differential gearing one wheel of which is connected to the revolving shaft of an electric motor meter and the opposite wheel of which is rotated at a uniform rate, corresponding to the predetermined maximum consumption. The planetary member of the differential gearing is accordingly driven in one or the other direction according as the energy consumption for the moment is above or below the predetermined value. When the energy consumption is above this predetermined maximum, the shaft of the planetary member of the differential gearing is arranged to release a clockwork or other suitable timekeeping mechanism which at all other times is maintained locked. The clock then operates a register thereby registering the length of time the predetermined maximum consumption of energy was exceeded.

For a better understanding of my invention, reference is to be had to the accompanying drawings, in which—

Figure 1 shows diagrammatically the novel features of my invention as applied to a motor type meter; and Fig. 2 is a modification thereof in certain respects.

Referring first to Fig. 1 of the drawings, there is represented diagrammatically a revolving shaft 1 of a motor meter. This shaft through its coöperation with gears 2 and 3 drives a shaft 4 and, by means of intermediate gearing, the gear member 5 of the differential gearing. The registering mechanism 6 is likewise driven through the shafts 1 and 4 and registers in the well known manner the total consumption of energy. The opposite gear wheel 7 of the differential gearing is rotated at a uniform speed by the shaft 8 and intermediate gearing. The shaft 8 is represented in Fig. 1 as driven by a constant speed electric motor 19, but it is evident that any other means may be employed which will give to the shaft a uniform speed. The shaft 8 is thus time-actuated and any suitable time-keeping mechanism may be employed to drive the same. The planetary member 17 of the differential gearing is fastened to the shaft 9, and the latter operates through suitable gearing to rotate a disk 10 provided at regular intervals with incisions 11. A lever 13 is pivoted at 12 and is provided at one end with a light spring member 24 which trails on the disk 10 and at its other end with a braking member 14. The braking member when in contact with the escapement 15 of the clock mechanism 16 is adapted to hold the escapement locked. The clock mechanism operates through suitable gearing a register 18 which records the length of time the clock runs.

The operation of my device, as shown in Fig. 1, is as follows: The gear member 7 of the differential gearing is rotated at a predetermined constant speed which corresponds to the fixed contract value of energy consumption. When the gear member 5 rotates at the same rate as gear member 7, the consumption of energy equals the predetermined fixed value. Under such circumstances gear members 5 and 7 will rotate at the same speed but in opposite directions and therefore the planetary member 17 will remain stationary. Such a condition is, however, rarely, if ever, actually attained in practice and the planetary gear will, therefore, always rotate in one direction or the other. If the consumption of energy falls below the predetermined value, the gear member 5 will rotate at a slower rate than gear member 7 and planetary gear 17 will impart to the disk 10 a rotation in the direction shown by the arrow. Such a rotation of the disk will cause the lever 13 to assume the position shown in the drawing, and brake 14 will hold the escapement of the clock locked. If the consumption of energy exceeds the predetermined value, the gear member 5 will rotate at a greater rate than gear member 7, and disk 10 will now be driven in the opposite direction from that shown by the arrow in Fig. 1. The end of the spring 24 will engage in one of the incisions 11 and the lever 13 will be swung about its pivot 12 and the brake 14 will be disengaged from the escapement 15. The clock mechanism is now free to operate, and will register the length of time the consumption of energy is in excess of the predetermined value. When the consumption of energy falls below the predetermined value, the lever 13 will again be operated upon so that the brake 14 will engage the escapement and lock the clock mechanism.

In Fig. 2 of the drawings, I have shown a clock mechanism 19′ for driving the gear member 7 of the differential gearing at a uniform rate. The clock mechanism serves also to operate the register 18. In this figure, the gear member 7 is rotated by means of the shaft 21 which is driven by the clock mechanism. The shaft 21 carries a gear 22 which is adapted to mesh with a pinion 23 fixed to a pivoted shaft 20. The shaft 20 drives the registering mechanism 18 in the well known manner. The lever 13′ is pivoted at 12′ and has one end in operative engagement with the shaft 20 and is provided at its opposite end with a spring 24′ which trails along the disk 10. When the consumption of energy is below the predetermined maximum, the disk 10 will rotate in the direction shown by the arrow and the spring 24 will turn the lever so as to hold gears 22 and 23 out of engagement. When the consumption of energy exceeds the predetermined contract amount, spring 24′ will engage in one of the incisions of the disk and will turn lever 13′ so as to throw gears 22 and 23 in mesh and thus place in operation the register 18. The length of time that the consumption of energy exceeds the predetermined maximum will thus be registered on the register. When the consumption of energy falls again below the predetermined maximum, the disk will be rotated in the direction of the arrow and gears 22 and 23 will be disengaged.

While I have illustrated in the accompanying drawings a meter-register of a well known type for registering the length of time the metering of energy exceeds the predetermined value, it will, of course, be understood that any suitable means may be employed to obtain the desired registration. In the appended claims I have used the term "registering" in its generic sense with the intention of covering any of the well known forms of registrations.

What I claim as new and desire to secure by Letters Patent of the United States, is—

1. The combination with an electric meter having a rotatable shaft, of a time-keeping mechanism, a register operatively related to said mechanism, means for locking said time-keeping mechanism to prevent its operation, and means for unlocking said time-keeping mechanism when the speed of rotation of said shaft exceeds a predetermined value whereby a registration is obtained upon said register of the total length of time the rate of metering of electric energy exceeded said predetermined value.

2. The combination with an electric metering mechanism, of a time-keeping mechanism, a register operatively related to said time-keeping mechanism and adapted to register the length of time said time-keeping mechanism operates, means normally locking said time-keeping mechanism to prevent its operation, and means for unlocking said time-keeping mechanism when the rate of metering of electric energy exceeds a predetermined value.

3. The combination with a time-keeping mechanism, of means responsive to the rate of consumption of electric energy in an electrical installation, a register operatively related to said time-keeping mechanism and adapted to register the length of time said time-keeping mechanism operates, means for locking said time-keeping mechanism to prevent its operation, and means operatively related to said first mentioned means and including a differential gearing for unlocking said time-keeping mechanism when the rate of consumption of electric energy exceeds a predetermined value.

4. The combination with a time-keeping mechanism, of a register operatively related thereto and adapted to register the length of time said mechanism operates, means responsive to the rate of consumption of electric energy in an electrical installation, means for normally preventing the operation of said time-keeping mechanism, and means operatively related to said first mentioned means for permitting said time-keeping mechanism to operate when the rate of consumption of electric energy exceeds a predetermined value whereby the total length of time that the rate of consumption of electric energy exceeded said predetermined value is registered upon said register.

5. The combination with an electric meter having a rotatable shaft, of a time-keeping mechanism, a register operatively related to said time-keeping mechanism and adapted to register the length of time said time-keeping mechanism operates, means normally preventing the operation of said time-keeping mechanism, and means including a time actuated member coöperating with the rotatable shaft of said meter and adapted to permit the operation of said time-keeping mechanism when the speed of rotation of said shaft exceeds a predetermined value whereby the total length of time that the rate of metering of electric energy exceeded said predetermined value is registered on said register.

6. The combination with an electric metering mechanism, of a time-keeping mechanism, a register adapted to be operated by said time-keeping mechanism, and means operatively related to said electric metering mechanism and including a differential gearing having a time-actuated member for causing said time-keeping mechanism to operate said register when the rate of metering of electric energy exceeds a predetermined value whereby the total length of time that the rate of metering of electric energy exceeded said predetermined value is registered on said register.

7. The combination with a time-keeping mechanism, of a register operatively related thereto and adapted to be operated thereby, means responsive to the rate of consumption of electric energy in an electrical installation, means whereby the operation of said register by said time-keeping mechanism is normally prevented, and means operatively related to said first mentioned means and including a differential gearing having a time-actuated member for causing said time-keeping mechanism to operate said register when the rate of consumption of electric energy exceeds a predetermined value whereby the total length of time that the rate of consumption of electric energy exceeded said predetermined value is registered on said register.

8. The combination with the rotatable shaft of an electric meter, of a differential gearing comprising two gear members and a planetary gear, means for driving one of said gear members from said shaft, means for driving the other of said gear members at a uniform speed, and means for registering the length of time the speed of the meter driven gear member exceeds the speed of the other gear member.

9. The combination with the rotatable shaft of an electric meter, of a differential gearing comprising two gear members and a planetary gear, means for driving one of said gear members from said shaft, means for driving the other of said gear members at a constant speed, a rotatable disk in operative relation with said planetary gear, and means for registering the total duration of time the disk rotates in one direction.

10. The combination with the rotatable shaft of an electric meter, of a differential gearing comprising two gear members and a planetary gear, means for driving one of said gear members from said shaft, means for driving the other of said gear members at a constant speed, a rotatable disk in operative relation with said planetary gear, a clockwork mechanism, means for holding said clockwork mechanism locked when the disk revolves in one direction and unlocked when the disk revolves in the other direction, and a register in operative relation with said clockwork mechanism for registering the length of time said clockwork mechanism is held unlocked.

In witness whereof, I have hereunto set my hand this first day of May, 1912.

JOSEPH VIVELL.

Witnesses:
MAX HELM,
HENRY HASPER.